Nov. 15, 1966   K. SCHLESINGER   3,286,114
VARIABLE MAGNIFICATION ELECTRON LENS
Filed Sept. 16, 1963   3 Sheets-Sheet 1

INVENTOR:
KURT SCHLESINGER,
BY James J. Lichiello
HIS ATTORNEY.

Nov. 15, 1966  K. SCHLESINGER  3,286,114
VARIABLE MAGNIFICATION ELECTRON LENS
Filed Sept. 16, 1963  3 Sheets-Sheet 2

INVENTOR:
KURT SCHLESINGER,
BY *James J. Lichiello*
HIS ATTORNEY.

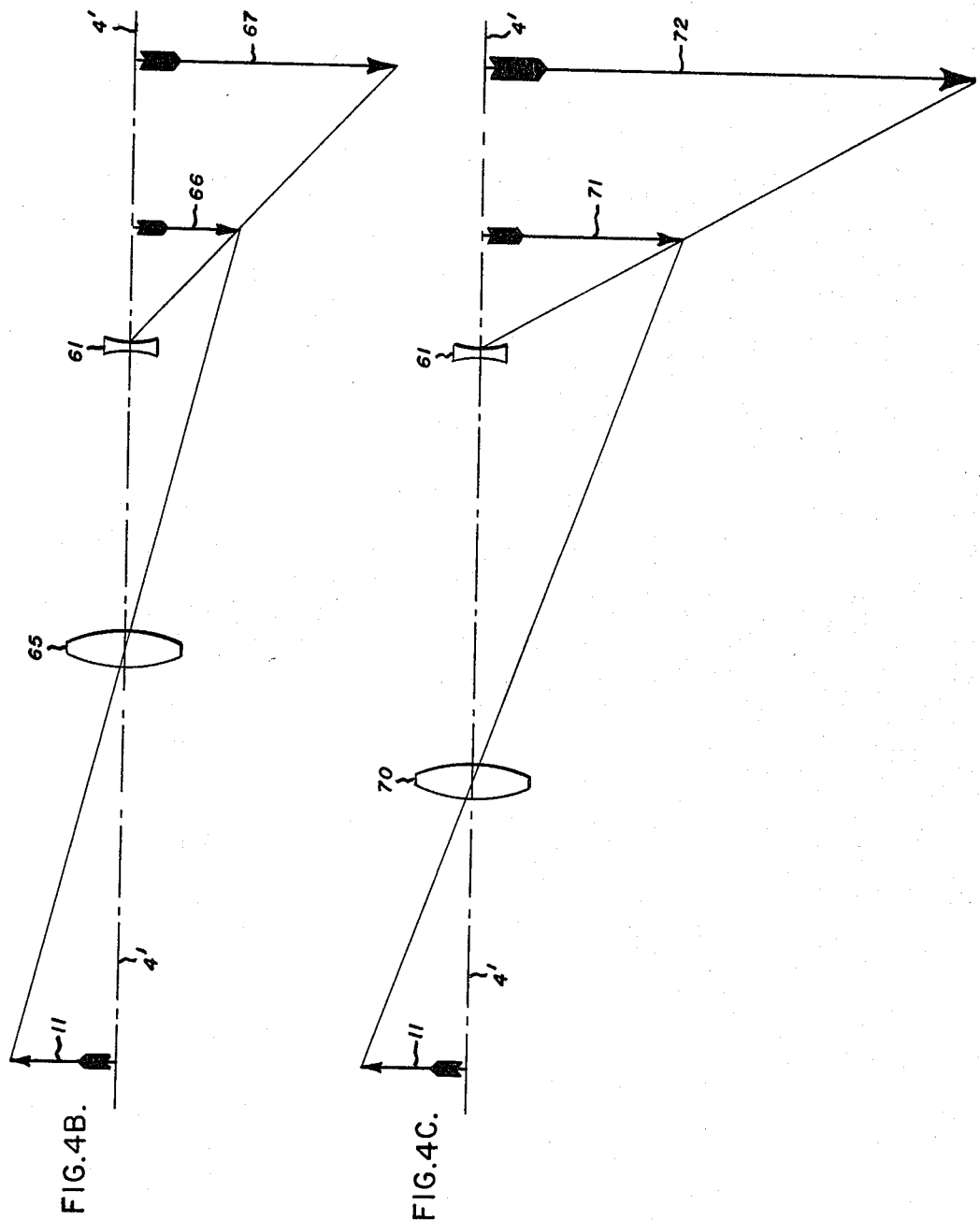

United States Patent Office 3,286,114
Patented Nov. 15, 1966

3,286,114
VARIABLE MAGNIFICATION ELECTRON LENS
Kurt Schlesinger, Fayetteville, N.Y., assignor to General
Electric Company, a corporation of New York
Filed Sept. 16, 1963, Ser. No. 308,952
14 Claims. (Cl. 313—83)

This invention relates to an electron lens for an image converter tube and, in particular, to an electron lens for controlling the size of the image resulting from impingement of electrons on the target.

It is often desirable in image tubes for converting invisible radiation to a visible image, or for converting an optical image to a charge pattern on a target, to vary the size of the image. For example, effective recording of a television scene requires that the television camera be capable of variable focal length in order to easily change the effective field of view of the camera. This is presently accomplished by optical systems of lenses in which two or more of the lenses are moved or adjusted with respect to each other to attain a variable focal length and, hence, variable magnification, while the image is kept in the same image plane. Such systems require a large number of lenses with complicated cam or other mechanical arrangements to control the positions of the lenses in the system. The present invention obviates the use of such complex optical lens systems and provides variations of the effective image size in an image converter tube entirely by electrical means.

It is an object of the invention to provide an improved electron lens for effecting variation in image size.

It is another object of the invention to provide an improved electrostatic electron lens for effecting variation of image size in an image converter tube.

It is another object of the invention to provide a variable magnification electrostatic electron lens in an image converter tube enabling image size to be controlled by electrical means.

It is a further object of the invention to provide such a lens wherein image size variation in excess of 4 to 1 is attainable.

It is a further object of the invention to provide an electron optical system in an image converter tube for effecting variation in image size where the area of the target upon which the electron stream impinges is maintained substantially constant.

Briefly stated, in accordance with one preferred and illustrated embodiment of this invention, a variable magnification electrostatic electron lens is provided which comprises two cylindrical spiral lens units positioned in tandem intermediate a cathode and a target in an image converter tube and surrounding the axis of the tube. Each spiral lens unit comprises two electrically resistive spiral electrodes separated by an electrically conductive band. The resistive spiral electrodes and the conductive band of each spiral lens unit are electrically interconnected and energized to provide a focusing electric field having a quadratic potential distribution along the axis. The adjacent resistive spiral electrodes of the two lens units are interconnected. Electrodes in the form of meshes are provided at the input and output of the variable magnification lens to terminate the electric fields. Electrical terminals are provided at opposite ends of the lens, at the conductive bands of each lens unit, and at the point of interconnection of the two lens units. The terminals at the opposite ends of the lens are normally interconnected. Predetermined potentials are applied to the terminals to energize the spiral lens units, the potentials applied to the conductive bands and to the point of interconnection of the two lens units being varied to vary the magnification of the lens and the size of the real inverted image produced on the target.

The subject matter of the invention is particularly pointed out and distinctly claimed in the concluding portion of the specification. The invention, however, both as to organization and method of opertaion may best be understood by reference to the following description taken in connection with the accompanying drawing, in which:

FIGS. 4A–4C illustrate the operation of the FIG. 4 embodiment for three modes of operation of the variable magnification electron lens of the invention.

Figure 1:
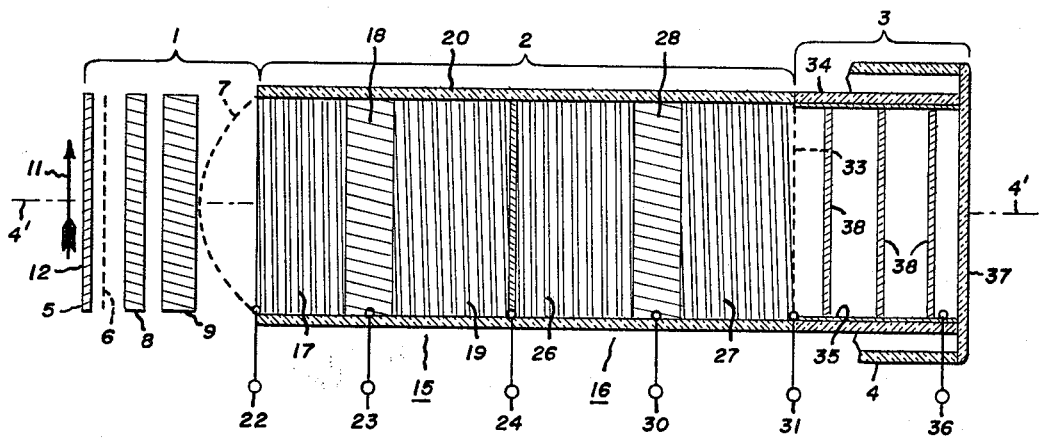
FIG. 1 is a sectional view along the length of an image converter tube incorporating the variable magnification electron lens of the invention.

With reference to FIG. 1, the image converter tube illustrated therein comprises a cathode-lens section 1, a variable magnification lens section 2, and a post-acceleration and target section 3. The cathode-lens section 1 received visible or invisible radiation representative of an image externally of the tube and produces an electron stream having a pattern corresponding to the image, the electron stream progressing through lens section 2 toward post-acceleration and target section 3. Lens section 2 focuses the electron stream provided by cathode-lens section 1 and varies the size of the electron pattern and the resultant image in accordance with practices of this invention. Section 3 accelerates the electrons toward the target upon which the electron pattern impinges for reproduction of the image. Sections 1, 2 and 3 are enclosed in a suitable envelope 4 and are coaxial with axis 4' of the tube.

Cathode-lens section 1 comprises a flat planar cathode 5, a flat planar perforate or fine mesh electrode 6, a hyper-convex perforate or fine mesh electrode 7, and electrical conductive bands 8 and 9 interposed between meshes 6 and 7. Planar cathode 5 may be a photocathode sensitive to radiation in either the visible or invisible spectrum, e.g., infra-red radiation. In response to focusing of an image 11 upon surface 12 of planar cathode 5, electrons are emitted from the elemental areas of cathode 5 in proportion to the amount of radiation impinging on the respective elemental areas, the electron pattern emitted from cathode 5 thus corresponding to the image focused thereon. Planar mesh 6 serves as the first anode in cathode-lens section 1 while mesh 7 serves as the second anode. Conductive bands 8 and 9 are employed to adjust potential distributon in the cathode-lens section. Cathode-lens section 1 permits electrostatic image formation between two planar surfaces and obviates the use of a curved cathode. The particular arrangement and function of cathode-lens section 1 is disclosed and claimed in copending application Serial No. 309,172, filed concurrently herewith and assigned to the same assignee as the present invention.

Lens section 2 is the variable magnification electrostatic electron lens part of the present invention, which may be termed a "zoom" lens. Section 2 comprises a first cylindrical spiral electrostatic lens unit 15, and a second cylindrical spiral electrostatic lens unit 16 surrounding and coaxial with tube axis 4' and positioned in tandem between cathode-lens section 1 and post-acceleration and target section 3. Spiral lens units 15 and 16 each provide focusing electric fields having a potential at the tube axis 4' which varies approximately as a quadratic function of displacement along the tube axis and thus each lens unit functions as an electrostatic lens.

Spiral lens unit 15 comprises a first spiral electrode 17, an electrical conductive band 18, and a second spiral electrode 19. Spiral electrodes 17 and 19 in one form are provided by electrical resistive coatings on the interior wall of a glass support cylinder 20. Conductive band 18 in one form is also provided by a conductive coating on the interior wall of cylinder 20. The end of spiral electrode 17 adjacent cathode-lens section 1 is connected, along with mesh 7, to an electrical terminal 22 while the opposite end of spiral electrode 17 is connected to conductive band 18. An electrical terminal 23 is connected to conductive band 18. The end of spiral electrode 19 adjacent conductive band 18 is connected thereto, the opposite end of spiral electrode 19 being connected to electrical terminal 24.

Spiral lens unit 16 similarly comprises spiral electrodes 26 and 27 interconnected by an electrically conductive band 28. The end of spiral electrode 26 adjacent spiral lens unit 15 is connected to terminal 24. Spiral lens units 15 and 16 are thus both connected at terminal 24. Conductive band 28 is connected to electrical terminal 30 while the end of spiral electrode 27 adjacent section 3 is connected to electrical terminal 31. A flat planar electrically conductive terminating perforate or fine mesh electrode 33 is positioned at the end of spiral lens unit 16 adjacent post-acceleration and target section 3 and is connected to terminal 31.

Post-acceleration and target section 3 of the image converter tube illustrated in FIG. 1 comprises a glass support cylinder 34 with a high resistivity, semi-conductive film 35, for example titanium oxide, coated on the interior surface of cylinder 34. Cylinder 34 is coaxial with the tube axis 4'. The semi-conductive film 35 is electrically connected to terminal 31 and an electrical terminal 36 is connected to film 35 at a point adjacent target 37. A high potential, on the order of about 6 to 16 kilovolts, is applied to terminal 36 to provide an accelerating electric field within cylinder 34 to accelerate the electrons between lens section 2 and target 37. Rings 38, formed of silver or other suitable material, are provided on semi-conductive film 35 and float electrically at the potentials established on film 35 at the ring positions by the potentials applied to terminals 31 and 36, the rings serving to insure symmetry of the accelerating electric field within cylinder 34. Target 37 may be a fluorescent screen for rendering visible the image represented by the electron pattern. Target 37 may also be the target of an image orthicon.

Figure 2A:
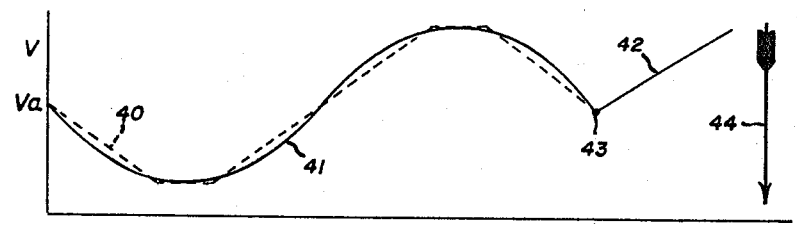
FIGS. 2A–2C illustrate the potential distribution along the axis of the lens and the image tube for three modes of operation of the variable magnification electron lens of FIG. 1.

Varying degrees of magnification are attained in the electron lens of the invention by controlling the potentials applied to terminals 22–24, 30 and 31 of the lens, e.g., by means of ganged voltage dividers or wafer switches (not shown). These terminals, as previously described, are connected to spaced points on the two spiral lens units 15 and 16 and, by proper selection of the potentials applied to the terminals, the potential distribution along the axis may be controlled to provide a given type and amount of lens action and, hence, a given degree of magnification. FIG. 2A illustrates the variation of space potential along the axis for one mode of operation of the variable magnification electron lens of the invention. In this mode, terminals 22 and 31, and hence meshes 7 and 35, are maintained at the same potential $V_a$. Potential $V_a$ is also applied to terminal 24 which is the point of connection of spiral lens units 15 and 16. Potentials less than and greater than $V_a$ are applied to terminals 23 and 30 respectively. The resulting variation in potential along the tube wall within lens section 2 is illustrated by dashed line 40. The resulting, approximately quadratic, potential variation along axis 4' is illustrated by solid line 41. The desired quadratic potential distribution along axis 4' may be achieved with a non-linear spiral but ideally is more easily approximated with linear spirals and conductive bands, as shown. Closer approximation of the ideal quadratic potential distribution may be attained by replacing each spiral electrode 17, 19, 26 and 27 by two linear spiral sections of different pitch but equal resistance.

Curve 42 indicates the potential distribution in the post-acceleration and target section 3. In the mode of operation illustrated in FIG. 2A, mesh 33 is necessary at the output of lens section 2 because of the electric field discontinuity illustrated at 43. Mesh 33 serves to terminate the electric fields in lens section 2 and post-acceleration and target section 3, thereby enabling operation in this mode. The FIG. 2A mode offers the greatest magnification, producing an image on target 37 which is approximately 50% larger than that focused on cathode 5, as illustrated graphically at 44. Since meshes 7 and 33 at the input and output respectively of lens section 2 are at the same potential in this mode, the lens section 2 imparts no acceleration to the electron stream passing therethrough.

Figure 2B:
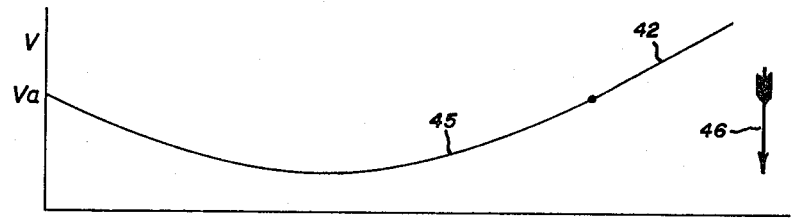

In the mode of operation illustrated in FIG. 2B, terminals 22 and 31 are maintained at the same potential $V_a$ while a lower potential is applied to terminal 24. Terminals 23 and 30 are allowed to float electrically so that conductive bands 18 and 28 assume potentials intermediate $V_a$ and the potential applied to terminal 24. The resultant potential distribution is continuous along the axis of the tube within lens section 2 and approximates the distribution illustrated by curve 45 in FIG. 2B. In this mode of operation, there is no electric field discontinuity between lens section 2 and post-acceleration and target section 3 and mesh 33 is unnecessary. The image at target 37 is approximately 75% of the size of the image focused on cathode 5 in the FIG. 2B mode of operation, as illustrated graphically at 46. Lens section 2, in this mode, is also non-accelerating since meshes 7 and 33 are at the same potential.

Figure 2C:
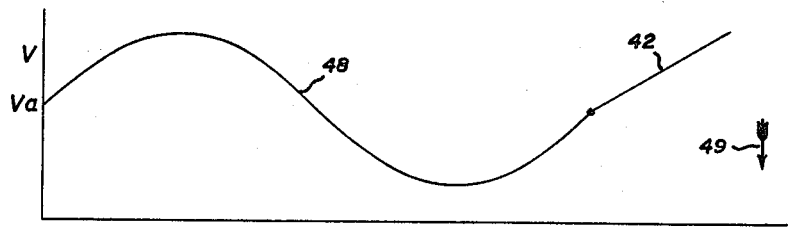

FIG. 2C illustrates a third mode wherein the potential $V_a$ is applied to terminals 22, 24 and 31 while potentials greater than and less than $V_a$ are applied to terminals 23 and 30 respectively. The quadratic potential distribution which is approximated in this mode is illustrated by curve 48 in FIG. 2C. As in the mode of FIG. 2B no electric field discontinuity exists at the output of lens section 2 and mesh 33 is unnecessary. This mode provides an image on target 37 approximately one-third the size of that focused on cathode 5, as illustrated graphically at 49. Since meshes 7 and 33 are at the same potential, lens section 2 is non-accelerating in mode 2C as in modes 2A and 2B.

The three modes of operation described and the potentials which have been used to attain them are summarized in the table below:

| Mode | Voltage on Terminals | | | | | | Magnification | Relative Magnification |
|---|---|---|---|---|---|---|---|---|
| | 22 | 23 | 24 | 30 | 31 | 36 | | |
| 2C | 1,500 | 2,650 | 1,500 | −210 | 1,500 | 6–16 kv | 1/3 | 1 |
| 2B | 1,500 | [1] 750 | −260 | [1] 600 | 1,500 | 6–16 kv | 3/4 | 2.25 |
| 2A | 1,500 | 150 | 1,500 | 2,650 | 1,500 | 6–16 kv | 3/2 | 4.5 |

[1] Self-setting voltages determined by spiral resistances. Mode 2B provides an image on target 37 which is 2.25 times the size of the image provided by mode 2C. The image size in the 2A mode is twice that of the 2B mode and 4.5 times that of the 2C mode. In the three modes described, the image remains in focus on the target, i.e., no refocusing is required upon switching between modes. Mesh 33 may be eliminated if operation in only modes 2B and 2C is desired, since no electric field discontinuity then exists at the output of lens section 2.

Although only three modes of operation have been described, other modes are possible. In the described modes, terminal 22 is maintained at the same potential as terminal 31. If the potentials applied to these terminals are varied, in addition to the potentials applied to terminals 23, 24 and 30, a wide range of magnification is possible.

As revealed in the above table, modes 2B and 2C provide an image on the target 37 which is smaller than that focused on cathode 5. The proportion of the usable area of target 37 actually used thus varies for different modes of operation of the variable magnification electron lens section 2. It may be desirable to have the image at target 37 utilize the entire usable area of the target for all modes of the operation of the lens section. To this end, post-acceleration and target section 3, in FIG. 1, may be replaced by section 50, in FIG. 3. The elements of the FIG. 3 embodiment which are common to FIG. 1 are given the same reference numerals.

Section 50 includes a magnifying electrostatic electron lens comprising concave perforate or mesh electrode 51, electrically insulating support cylinder 52, non-linear spiral electrode 53, and electrically conductive band 54. Section 50 is longer than section 3 in FIG. 1 and hence the overall length of the tube is increased. The concave curvature of mesh 51 permits greater magnification in section 50 than is obtainable with a planar mesh. The concave curvature of mesh 51 faces or projects toward cathode 5. Non-linear spiral electrode 53 and conductive band 54 are supported on the interior surface of insulative support cylinder 52. The end of spiral electrode 53 adjacent band 54 is connected thereto, while the end of electrode 53 adjacent mesh 51 is connected, along with mesh 51, to electrode 31 of variable magnification electron lens section 2. Conductive band 54 is connected to electrical terminal 55.

In operation, conductive band 54 is maintained at a high positive potential, e.g., 15,000 volts, with respect to the potential on mesh 51 and the end of electrode 53 connected to mesh 51. Spiral electrode 53 in conjunction with conductive band 54 generates a diverging electrostatic hyperbolic field along the tube axis 4' in the volume enclosed between mesh 51 and target 37. The electrons entering this volume experience acceleration due to the high positive potential on band 54.

Spiral electrode 53 and conductive band 54 constitute a diverging or magnifying accelerating lens which is designed to have a magnifying power of approximately 3×. This lens serves as an enlarger to compensate for image size reduction in variable magnification electron lens section 2. Thus, with lens section 2 operating in mode 2C, there will be a 1-to-1 correspondence between the image appearing on target 37 and the image focused on cathode 5. As section 2 is switched from mode 2C to modes 2A and 2B with a corresponding increase in magnification of the image focused on target 5, parts of the magnified images will fall outside of screen 37.

Figure 3:
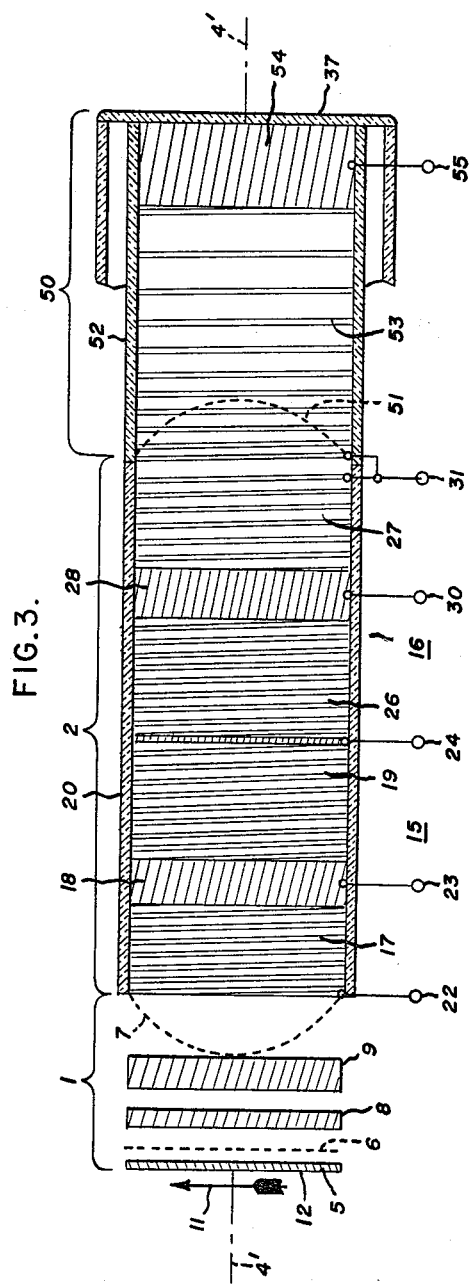
FIG. 3 is a sectional view along the length of an alternative embodiment of an image converter tube incorporating the variable magnification electron lens of the invention.
Figure 4A:
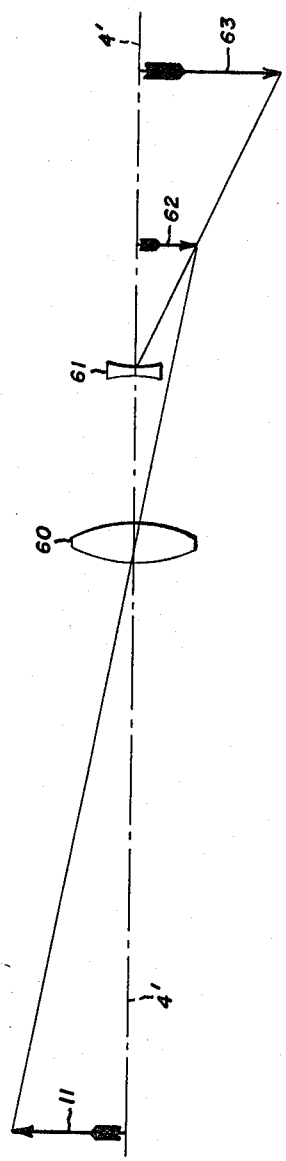

The operation of the embodiment of FIG. 3 is illustrated in FIGS. 4A-4C. In FIG. 4A, variable magnification electron lens section 2 is operated in mode 2C. In this mode, lens section 2 may be represented by a converging equivalent thin lens 60 positioned as shown along axis 4'. The magnifying electrostatic electron lens formed by spiral electrode 53 and conductive band 54 may be represented by a diverging equivalent thin lens 61, positioned as shown along axis 4'. As previously described, lens section 2 operating in mode 2C produces an image at a predetermined distance beyond the mesh terminating section 2, as illustrated at 62 in FIG. 4A. Since lens 60 produces an image 62 which is approximately one-third the size of image 11 focused on cathode 5, and lens 61 has a magnifying power of approximately 3×, image 63 focused on target 37 is approximately the same size as image 11, in this mode of operation. Hence, image 63 will extend across the entire usable viewing diameter of target 37.

When lens section 2 is operated in mode 2B, the converging equivalent thin lens is positioned along axis 4' as illustrated at 65 in FIG. 4B. Since the image 66 produced by lens section 2 in this mode of operation is approximately three-fourths the size of image 11, the image 67 on target 37 will be approximately 2.25 times that of image 11 due to the magnifying action of diverging equivalent thin lens 61. In this mode, the target will be overscanned and parts of image 67 fall outside of screen 37.

Similarly, when lens section 2 is operated in mode 2A, the converging equivalent thin lens 70 is positioned along axis 4' with a resulting image 71, as illustrated in FIG. 4C. In this mode, the size of image 72 produced by lens 61 is approximately 4.5 times that of image 11. As in FIG. 4B, target 37 is again overscanned and portions of image 72 fall outside of screen 37.

The FIG. 3 embodiment employing a magnifying accelerating electrostatic lens, which serves as enlarger, in conjunction with the variable magnification electron lens thus provides an image at target 37 which extends across the entire viewing area for all modes of operation of the variable magnification electron lens. Back-scattering and reflection of electrons from the walls of support cylinder 52, due to overscanning, with resulting image deterioration on the target is avoided since the positive spiral electrode 53 absorbs the overscanned electrons. Variation of image brightness at target 37 for different modes of operation of the variable magnification electron lens may be compensated for by varying the potential applied to terminal 55.

Although the invention and its operation has been described with reference to specific embodiments, the invention is not to be limited to these embodiments. Many modifications will be obvious to those skilled in the art. For example, a variable magnification electron lens may be constructed in accordance with the invention employing more than two spiral lens units. It is thus intended that the invention be not limited to the particular details shown and described which may be varied without departing from the spirit and scope of the invention and the appended claims.

What I claim as new and desire to secure by Letters Patent of the United States is:

1. A variable magnification electron lens comprising:
    (a) a first electrostatic lens unit for generating a first electric field having a substantially quadratic potential distribution along its axis,
    (b) a second electrostatic lens unit coaxial with and positioned in tandem with respect to said first lens unit for generating a second electric field having a substantially quadratic potential distribution along said axis, and
    (c) means for varying the quadratic potential distribution between said electric fields generated by said first and said second electrostatic lens units to vary the magnification of said electron lens.

2. The variable magnification electron lens of claim 1 in which said first and said second electrostatic lens units comprise spiral lens units.

3. A variable magnification electron lens comprising:
    (a) a first spiral lens unit for generating a first electric field having a substantially quadratic potential distribution along its axis,
    (b) a second spiral lens unit coaxial with and positioned in tandem with respect to said first unit for generating a second electric field having a substantially quadratic potential distribution along said axis,
    (c) a plurality of terminals connected to spaced points on said first and said second spiral lens units for applying voltages thereto, and
    (d) means for varying the voltage applied to at least one of said terminals for controlling the quadratic potential distribution of said electric fields generated by said first and said second spiral lens units to vary the magnification of said electron lens.

4. The variable magnification electron lens of claim 3 in which meshes are positioned across the input and output ends of said variable magnification electron lens.

5. The variable magnification electron lens of claim 3 in which a mesh is positioned across the input to said variable magnification electron lens.

6. A variable magnification electron lens comprising:
   (a) a first spiral lens unit for generating a first electric field having a substantially quadratic potential distribution along its axis,
   (b) a second spiral lens unit coaxial with and positioned in tandem with respect to said first unit for generating a second electric field having a substantially quadratic potential distribution along said axis,
   (c) a first terminal connected to adjacent ends of said first and said second spiral lens units for applying a voltage thereto,
   (d) second and third terminals connected to opposite ends of said first and said second spiral lens units respectively for applying voltages thereto, and
   (e) means for varying the voltage applied to at least one of said terminals for controlling the quadratic potential distribution of said electric fields generated by said first and second spiral lens units to vary the magnification of said electron lens.

7. The variable magnification electron lens of claim 6 in which fourth and fifth terminals are connected to intermediate points on said first and said second spiral lens units respectively for applying voltage thereto.

8. The variable magnification electron lens of claim 7 in which meshes are positioned across the input and output ends of said electron lens.

9. A variable magnification electron lens comprising:
   (a) a first spiral lens unit for generating a first electric field having a substantially quadratic potential distribution along its axis,
   (b) a second spiral lens unit coaxial with and positioned in tandem with respect to said first unit for generating a second electric field having a substantially quadratic potential distribution along said axis,
   (c) means connected to the adjacent and opposite ends of said first and second second spiral lens units for applying predetermined voltages thereto, and
   (d) means connected to intermediate points on said first and said second spiral lens units for applying variable voltages thereto for controlling the quadratic potential distribution of said electric fields generated by said first and said second spiral lens units to vary the magnification of said electron lens.

10. In an image converter tube including a cathode and a target spaced from said cathode along the tube axis, an electron optical system comprising:
    (a) a first electrostatic lens unit coaxial with said tube axis and positioned between said cathode and said target for generating a first electric field having a substantially quadratic potential distribution along said axis,
    (b) a second electrostatic lens unit coaxial with said tube axis and positioned in tandem with said first lens unit between said first lens unit and said target for generating a second electric field having a substantially quadratic potential distribution along said axis, said first and said second electrostatic lens units forming a variable magnification electron lens,
    (c) means for varying the quadratic potential distribution of said electric fields generated by said first and said second electrostatic lens units to vary the magnification of said variable magnification electron lens, and
    (d) a diverging electrostatic lens coaxial with said tube axis and positioned between said second electrostatic lens unit and said target for magnifying the image produced by said variable magnification electron lens.

11. The electron optical system of claim 10 which includes a mesh positioned between said second electrostatic lens unit and said diverging electrostatic lens.

12. In an image converter tube including a cathode and a target spaced from said cathode along the tube axis, an electron optical system comprising:
    (a) a first spiral lens unit coaxial with said tube axis and positioned between said cathode and said target for generating a first electric field having a substantially quadratic potential distribution along said axis,
    (b) a second spiral lens unit coaxial with said tube axis and positioned in tandem with said first spiral lens unit between said first lens unit and said target for generating a second electric field having a substantially quadratic potential distribution along said axis, said first and said second spiral lens units forming a variable magnification electron lens,
    (c) a plurality of terminals connected to spaced points on said first and said second spiral lens units for applying voltages thereto,
    (d) means for varying the voltage applied to at least one of said terminals for controlling the quadratic potential distribution of said electric fields generated by said first and said second spiral lens units to vary the magnification of said variable magnification electron lens, and
    (e) a diverging accelerating electrostatic lens coaxial with said tube axis positioned between said second spiral lens unit and said target for magnifying the image produced by said variable magnification electron lens.

13. The electron optical system of claim 12 which includes means for varying the accelerating field generated by said diverging accelerating electrostatic lens to compensate for image brightness variations which result from variations in magnification of said variable magnification electron lens.

14. The electron optical system of claim 12 which includes a concave mesh positioned between said second electrostatic lens unit and said diverging electrostatic lens, the concave curvature of said mesh facing said cathode.

No references cited.

JAMES W. LAWRENCE, *Primary Examiner.*

R. SEGAL, *Assistant Examiner.*